United States Patent [19]
Kane

[11] 3,912,823
[45] Oct. 14, 1975

[54] VACUUM SKIN-PACKAGE FOR COOKING FOOD

[75] Inventor: William Paul Kane, Bon Air, Va.

[73] Assignee: E. I. Du Pont de Nemours and Company, Wilmington, Del.

[22] Filed: Feb. 23, 1973

[21] Appl. No.: 335,118

[52] U.S. Cl............... 426/129; 206/471; 229/3.5 R; 426/106; 426/412
[51] Int. Cl.² ............................................ B65B 29/08
[58] Field of Search ........... 426/415, 410, 412, 106, 426/129, 396, 407, 397, 392, 523, 113, 114; 264/90, 92; 260/75 T, 75 R; 161/231, 119, 120; 206/471; 229/3.5 R

[56] References Cited
UNITED STATES PATENTS

| | | |
|---|---|---|
| 2,784,456 | 3/1957 | Grabenstein..................... 260/75 X |
| 3,429,854 | 2/1969 | Seckmavern et al. ............ 264/92 X |
| 3,507,383 | 4/1970 | Rorer................................. 206/471 |
| 3,547,891 | 12/1970 | Snead et al. .................... 264/237 X |
| 3,554,976 | 1/1971 | Hull................................. 260/75 M |
| 3,695,900 | 10/1972 | Young et al. ................... 426/396 X |
| 3,750,873 | 8/1973 | Roman............................. 426/126 |
| 3,755,042 | 8/1973 | Robertson et al. ............. 206/471 X |
| T915,001 | 10/1973 | Berkebile et al................. 264/92 X |

FOREIGN PATENTS OR APPLICATIONS 616,819   3/1961   Canada.............................. 426/396

Primary Examiner—Frank W. Lutter
Assistant Examiner—Steven L. Weinstein

[57] ABSTRACT

A vacuum skin-package is provided formed from a substantially amorphous polyethylene terephthalate package member of less than 15% crystallinity and a polyethylene terephthalate-azelate package member with a product contained therebetween.

1 Claim, 1 Drawing Figure

U.S. Patent    Oct. 14, 1975    3,912,823
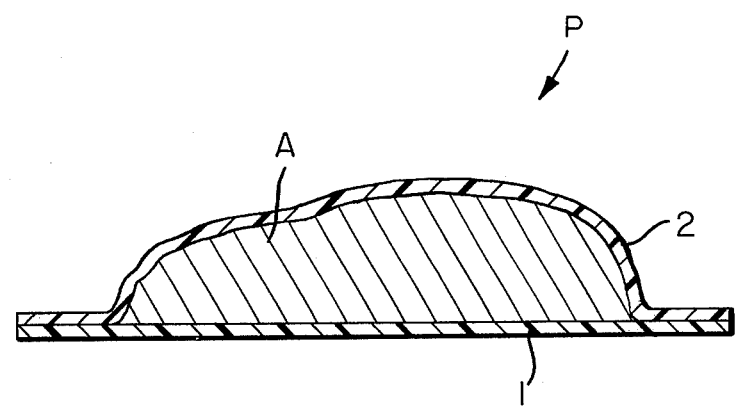

VACUUM SKIN-PACKAGE FOR COOKING FOOD

BACKGROUND OF THE INVENTION

1. Field of the Invention

This invention is a novel vacuum skin-package formed from specific materials (i.e., polyethylene terephthalate-azelate film and polyethylene terephthalate film of less than 15% crystallinity). Such package may be used in cooking foods at temperatures up to about 400°F.

2. Description of the Prior Art

U.S. Pat. No. 3,547,388 to Hernnes is exemplary of the prior art. Such patent discloses a food package including a one piece container and a two-layer laminated film cover joined to a flange thereof. The upper layer of the cover film laminate has properties similar to the material from which the container body is made.

U.S. Pat. No. 2,784,456 to Grabenstein discloses a polyethylene terephthalate film that is stretched from 1.5 to 3.0 times in the transverse direction from an essentially amorphous state and that is not subsequently subjected to any machine direction stretching or heat setting. This film is readily deformable and has a low degree of crystallinity of up to 10–14%.

U.S. Pat. No. 3,429,854 to Siggel et al. shows a process for vacuum deep drawing an essentially amorphous sheet of polyethylene terephthalate film onto a mold surface, such film having up to about 25% crystallization.

U.S. Pat. No. 3,547,891 to Snead et al. shows a readily heat-formable polyester terephthalate film that has been slightly strained under controlled temperature conditions so that the web is still free of appreciable molecular orientation.

U.S. Pat. No. 3,554,976 to Hull shows a process for forming a copolymer of polyethylene terephthalate modified with dihydroxyethyl azelate which when cast into film form yields a readily formable copolyester web.

U.S. Pat. No. 3,550,835 to Persson is exemplary of the cooking container arts. Such patent teaches a package especially for food products, which package is a tray erected from a paperboard blank which has at least on one side a fluid-type plastic coating, i.e., polypropylene, which is adapted to be sealed and withstands heating to about 302°F. While this package is suitable for relatively low cooking temperature use, it cannot withstand heating at the high temperatures above 325°F., which temperatures are those most commonly used in the precooked food convenience food areas of cooking.

None of these patents show a thermally stable vacuum skin-package of the type of the instant invention in which food may be cooked or reheated at cooking temperatures up to about 400°F.

SUMMARY OF THE INVENTION

According to the present invention, a package is provided for use, preferably, in the packaging of food and for use in the subsequent cooking or reheating of the food in preparation for human consumption. The package is made from polyethylene terephthalate materials. In forming the package, a specific polyethylene terephthalate upper member, or parts of it, is brought into contact with parts of a specific polyethylene terephthalate lower member and heat-sealed together. Food in the package may then be reheated or heated to temperatures above 400°F.

This package does not deleteriously effect the cooking of the food contained therein and may be formed at heat-sealing temperatures using vacuum skin-packaging methods and cooked or used at high cooking temperatures and still remain attractive in appearance and useful.

More specifically, this invention is a method of making an oven-stable, vacuum skin-package. The package so made is also a part of this invention.

Briefly described, the package-making method of this invention includes the steps of:

positioning an article to be packaged between an upper package member of polyethylene terephthalate film having a degree of crystallinity of less than 15% and a lower package member of polyethylene terephthalate-azelate film with the article resting on the lower member;

heating at least the upper member to render it drapable;

moving the article and the upper member relative to each other thereby to drape the heated film over the article;

withdrawing air from between the upper and lower member; and moving the upper member into skin-like engagement with the article and into engagement with the lower member to seal these members together, thereby to form a vacuum skin-package.

Further, this invention is a skin-package made by this method. This package is particularly useful in a method of cooking which, briefly described, includes the steps of:

forming a vacuum skin-package of an upper package member of polyethylene terephthalate film having a crystallinity of less than 15% and a lower member of polyethylene terephthalate-azelate film with food positioned therebetween and with the upper and lower member being heat-sealed to each other, and cooking the food at a temperature of up to 400°F.

By this invention, then, there is produced a novel skin-package that is oven-stable and that gives to the arts of packaging and cooking a type of package not available to such arts before this invention.

Cooking containers or packages are known to the art. Many types of materials are used to fabricate these containers. Such materials can generally be characterized into one of three primary types or combinations of them. These types are paperboard, aluminum and thermoplastic materials. There are advantages and disadvantages resulting from the use of each of these types of materials in fabricating food containers.

Convenience foods, for example, may be precooked and packaged in certain containers and then reheated. For this reason they must be capable of withstanding this subsequent food heating operation. The containers used for this should be capable of being subjected to temperatures of up to about 400°F. Prior to this invention, skin-packages could not be so employed at these high temperatures.

The instant invention provides novel skin-package which exhibits unique packaging versatility. Specifically, the instant invention provides a skin-package for baking and cooking which comprises:

a lower web of polyethylene terephthalate-azelate film;
an upper web of polyethylene terephthalate film having a degree of crystallinity of less than 15%; and
an article, such as food, packaged between the upper and lower webs with surface portions of such webs being brought into abutting contact with each other and heat-sealed together to form a skin-package.

Such invention further provides a method of making a skin-package for cooking which comprises the steps of:
placing a product on the lower package member;
heating an upper package member and positioning it over the product;
subjecting the product to a vacuum; and
pushing the upper member against the product and against the lower member to seal the upper member to the lower member thereby forming a skin-package.

BRIEF DESCRIPTION OF DRAWING

The FIGURE is a cross-sectional view of a vacuum skin-package of this invention, made by a package-making method also of this invention.

DESCRIPTION OF THE PREFERRED EMBODIMENT

Referring to the drawing, it will be seen that the present invention is embodied in a skin-package P, which package may be produced by a method also of this invention, later to be described.

Such skin-package P comprises an article A, such as a piece of meat, packaged between and within a first package member 1 and a second package member 2, also further to be described.

Preferably, the package members 1 and 2 are impermeable material and are in web or sheet form, prior to the package-making operation.

This invention preferably provides a method of skin-packaging articles, such as meat.

In known methods of skin-packaging articles, a thermoplastic film is placed over an air-permeable base member on which the article to be packaged rests, is heated to a temperature at which it is readily formable, and is subjected to a partial vacuum by withdrawing air from between the thermoplastic film and the base member through the air-permeable base member. By the combination of such actions and package components, the thermoplastic film assumes a contour-conforming configuration with the article and is bonded to the air-permeable base member in all radial directions from the article. The base members are generally coated with an adhesive and are air-permeable either because they are perforated or because of the natural porosity of the material of the base member. Packages formed using these methods are not sealed from their ambient atmosphere. This greatly limits the types of products which can be so skin-packaged. It is most desirable, for example, to seal meat products from their ambient atmosphere in order to extend their display life; therefore, such methods would have no utility in this packaging area.

Certain skin-packaging methods are known wherein impermeable packaging members are employed for overwrapping the article being packaged. Such packages are formed in vacuum chambers. A high vacuum is formed between the packaging members and around the article being packaged within the vacuum chamber. This vacuum is then maintained between the members while the two web members are bonded to each other.

This invention provides a method of making hermetically sealed skin-packages using impermeable package members of specific polyethylene terephthalate materials.

Polyethylene terephthalate film has an unusual number of properties which enable it to serve a diverse range of applications. These properties make it particularly usable as a packaging material for food. As an example, polyethylene terephthalate film does not get brittle with age, it has a long shelf life; it provides a permanent, nonyellowing, dimensionally stable base and has excellent resistance to most chemicals and moisture. Further, it is resistant to initial tear and scratching and can withstand heavy impact and prolonged flexing. These and other properties are of great value in packaging applications.

Polyethylene terephthalate material, however, lacks certain properties which would enable it to serve as a package material in making a vacuum skin-package for foods, such as precooked meat, which skin-package further lacks the capability of being heated to cooking temperatures now commonly used. For example, such polyethylene terephthalate material lacks the required durability for functioning properly in a typical vacuum skin-packaging system and the skin-package itself, due to the material properties, will not withstand, without failure, the required or desired high cooking temperatures of up to about 400°F.

An important discovery of this invention is that polyethylene terephthalate materials may be modified in a critical and specific manner, as will be explained, and as modified will function properly in the vacuum skin-packaging systems of the type later to be described and will further function properly in being oven-stable when used in such packages and cooked at high cooking temperatures of up to 400°F.

PACKAGE-MAKING METHOD

The package-making method of this invention for making the vacuum skin-package P consisting of the article A (or articles A) contained between the first and second member 1 and 2, of the type described, includes the steps of:
placing food A on the lower package member 1 of polyethylene terephthalate-azelate film;
moving the upper package member 2 of polyethylene terephthalate film having a degree of crystallinity of less than 15% into skin-like engagement with the food A and into abutting contact with the lower package member 1; and,
heat-sealing such upper package member 2 to the upper surface of such lower package member 1 form the skin-package P.

The lower web 1 of the package P of this invention is of polyethylene terephthalate-azelate film of the type made in accordance with the teachings of U.S. Pat. No. 3,554,976 to Hull, which patent is hereby incorporated by reference. Such web may be either thermoformable or nonthermoformable.

In the process of making this particular film, dihydroxyethyl terephthalate and dihydroxyethyl azelate are copolymerized by conventional condensation polymerization techniques as illustrated, for example, in U.S. Pat. No. 2,465,319 to Whinfield and Dickson, which patent is hereby incorporated by reference. The polymerization is generally carried out at elevated temperatures, for example, about from 220° to 300°C. to increase the speed of the reaction. The reaction is also usually carried out under reduced pressure to facilitate the removal of the ethylene glycol formed in the condensation.

The quantity of dihydroxyethyl azelate used as a copolymer in the reaction will vary according to the physical characteristics desired in the finished film for example, the degree to which the glass transition temperature is to be depressed to obtain a workable F-80 value. This value is the room temperature force required to elongate the film by 80% of its initial length. In the absence of any diethylene glycol, this can be determined from FIG. 1 of the patent, which illustrates the depression of glass transition temperature of the completed copolymer as a function of the mole percent of azelate copolymer. In practice, the dihydroxyethyl terephthalate mixture further comprises varying amounts of diethylene glycol species including diethylene glycol esters of terephthalic acid since diethylene glycol is a reaction product of the ester interchange reaction generally used in the formation of the dihydroxyethyl terephthalate. The quantities of diethylene glycol species present can be determined by saponification of the polymer and passage of the resulting mixture of ethylene glycol and diethylene glycol through a gas chromatographic column to separate and measure the quantity of each component. These quantities usually vary between 0.5 and 45 mole percent of the dihydroxyethyl terephthalate mixture. From these data the ternary diagram of FIG. 3 of the patent is useful for determining the quantity of azelate to be added to provide the desired depression of the glass transition temperature, $\Delta T_g$. The curves shown illustrate the depression in glass transition temperature as a function of the mole percentage of diethylene glycol and dihydroxyethyl azelate copolymer. Generally, about from 1 to 25 mole percent of diethylene glycol will be present.

If the melting point of the product is a criterion of the utility of the product, then the weight percent of dihydroxyethyl azelate copolymer to be added can be determined from FIGS. 2 and 4 of the patent, which show the depression of the melting temperature respectively as a function of the mole percent and weight percent of dihydroxyethyl azelate added.

In practice, the additives are introduced by weight, based on the polymer throughput in a continuous process. For example, with dihydroxyethyl terephthalate obtained by the glycolysis of scrap film at 100 lbs. per hour of polymer output, 1 mole percent of dihydroxyethyl azelate is 1.44 lbs. per hour.

The completed copolyester can be cast into a film by conventional techniques. For example, the polyester can be immediately cast through a slit orifice directly onto a cooled quench drum, thereby eliminating the need for subsequent reheating of the copolymer before casting. After casting, the film can be molecularly oriented by uniaxial or biaxial stretching. In biaxially oriented films having a thickness of about 1 mil, an F-80 value of less than about 16,000 p.s.i. is generally desired. Generally, the films are oriented to a substantial degree by stretching at least 2.6 times in each of two mutually perpendicular directions. In film products containing less than about 15 mole percent azelate copolymer according to the instant invention and generally about from 2 to 10 mole percent, the above F-80 values are realized even after stretch orienting the cast film up to 3.5 times the original dimension in each of two mutually perpendicular directions.

The lower web 1 preferably is stretched 2.6 times in the machine direction and 2.7 times in the transverse direction and is heat set at 170°C. on making a material suitable for use in the skin-package P of this invention.

The thermoformable upper web 2 of the package P of this invention is polyethylene terephthalate film of the type made in accordance with the teachings of U.S. Pat. No. 2,784,456 to Grabenstein, which patent is hereby incorporated by reference. This patent teaches a process of stretching film of polyethylene terephthalate, or modified polyethylene terephthalate, under the particular conditions that result in a thermoformable film having a low degree of crystallinity.

Briefly stated, the process involves preheating an amorphous film of polyethylene terephthalate, or modified polyethylene terephthalate, in air or other inert gaseous atmosphere maintained at a temperature within the range of from about 110° to about 150°C., stretching said film from about 1.5X to 3.0X, and preferably 3X, its original dimension in the transverse direction, i.e., in a direction perpendicular to the direction in which the film has been extruded, calendered, cast, etc., in air maintained at a temperature within the range of from about 85° to about 135°C. and, thereafter, permitting the film to cool while maintaining it under stretching tension. The resulting film will be not more than 15% crystalline.

The production of polyethylene terephthalate material is fully disclosed in U.S. Pat. No. 3,465,319 to Whinfield and Dickson previously mentioned. From a commercial standpoint, the most attractive process for the production of polyethylene terephthalate film comprises carrying out an ester interchange between ethylene glycol and dimethyl terephthalate to form bis-2-hydroxy-ethyl terephthalate which is polymerized to polyethylene terephthalate under reduced pressure and at elevated temperatures. In such a reaction, various modified polyethylene terephthalates may be formed by reacting ethylene glycol, dimethyl terephthalate and a small quantity, e.g., 10–15%, of a low alkyl ester of one of the acids mentioned above.

To insure the optimum properties in the film, it is requisite that it be preheated in air or equivalent inert gaseous atmosphere maintained at a temperature within the range of from about 110° to about 150°C., and preferably, within the range of 120°–140°C.

Likewise, the temperature to which the film is subjected during stretch must be maintained within a reasonably narrow range, namely, within the range of from about 85° to about 135°C., assuming that the film has been preheated in air at a temperature of from 110° to 150°C. On the other hand, if the film is subjected to too high a temperature prior to or during stretch, the resulting film is crystallized to an undesirably high degree; and such elevated temperatures may cause plastic flow of the film. Preferably, the stretch should be carried out in air at a temperature of from 105° to 120°C. It is understood that the temperatures at which the film is preheated and at which the film is stretched are ambient temperatures (i.e., the temperature of the surrounding atmosphere) and these temperatures do not represent the exact temperature of the film. Actually, the film temperature during the stretching step will rise somewhat owing to heat generated within the film during stretching.

The degree of stretch is also a factor. Film stretched either substantially more or less than twice its original dimension under the temperature conditions hereinabove specified will have insufficient shrinkage; and, in general, the differential between the shrinkage in the direction of stretch and the shrinkage in the direction normal thereto will not be sufficiently great if the film is to be converted into heat-shrinkable or formable webs.

An additional factor, and one that inherently results when the herein specified temperature and stretch conditions are observed, is a very low degree of crystallinity. The crystallization of the stretched film should not exceed 15%, as determined by the density gradient method, and, preferably, should not exceed 5%. Film having a higher degree of crystallinity is not readily heat-sealable; and the seals when made are brittle, weak, and poor in appearance due to puckering of the film at the seal. Furthermore, less crystalline films exhibit greater receptivity for, and adhesion to various standard types of printing inks.

Because of their low degree of crystallinity, the upper package member 2 of polyethylene terephthalate film of the package P of the present invention may be suitably colored and/or printed upon for the purpose of individualizing and enhancing appearance. For example, rotogravure and aniline flexographic type printing inks may be employed for coloring the heat-shrinkable polyethylene terephthalate tubes, bands, and like structures, of the present invention. Printing may be used to form sheets of solid background colors with or without various indicia imprinted thereon. Furthermore, various indicia and/or designs, may be imprinted directly on the uncolored sheet.

Again to stress the criticality, the upper member 2 is the polyethylene terephthalate film and must be of less than 15% crystallinity. Such film has a density of 1.3300 to 1.3360 at 28°C. In making this film it is stretched preferably 3× in the transverse direction with no stretch in the machine direction, without heat setting. The film has better durability than cast polyethylene terephthalate of the same intrinsic viscosity and has heat-sealing properties equivalent to cast film.

This invention is particularly useful in packaging meat using automatic "deep draw" apparatus such as that typically described in U.S. Pat. No. 3,491,504 to Young et al., U.S. Pat. No. 3,694,991 to Perdue et al., and U.S. Pat. No. 3,636,678 to Moris et al.

In U.S. Pat. No. 3,491,504 to Young et al, for example, there is provided a method of and apparatus for skin-packaging products, such as fresh meat, fowl, fish and irregularly shaped items, in the presence of a vacuum. The package is formed using an upper film member which conforms to the shape of the product being packaged. The product is placed upon a lower member of film or upon a tray and the upper film member is heated and pushed into (i.e., draped over) the product. After this the various parts are subjected to a vacuum and after the vacuum is cut off the upper film member is pushed against the product and against the lower member to seal the upper member to the lower member thereby forming a heat sealed skin-package. It is important that the upper member that is to be drawn down around the meat or other product being packaged and into sealing contact with the lower film on which it rests be capable of being heated and being drawn deeply. The oven-stable, oxygen impermeable film of the package of this invention has these capabilities, and because of this, solves a problem, and serves a need, of the packaging arts.

In forming the package, the film is heated to between about 140° and 160°F. and the greater temperature is between about 230° and 240°F., which temperatures are required to provide heat sealability. The vacuum is applied for about 3 seconds.

The articles A being skin-packaged by the method of this invention can consist of the single unit, such as a cut of meat, or it can consist of a group of individual items, such as a group of frankfurters. Preferably, the meat is precooked prior to the package-making operation.

EXPERIMENT

The durability of the above-described skin-package, prior to oven cooking, was determined by packaging one pound of bacon therein, as described, which packages were then placed in a carton and stored overnight at 32°F. The carton was vibrated for 30 minutes at 500 cycles per minute. Before oven cooking, the durability of the packages as observed demonstrated a 0% failure rate.

The durability of the same samples was also checked after packaging preseared steaks and cooking for ten minutes in a conventional oven at 400°F. Again there was a 0% failure rate.

Accordingly, it is seen that this invention produces a vacuum skin-package for cooking food at a temperature of up to about 400°F.

I claim:
1. A vacuum skin-package suitable for cooking at temperatures of up to about 400°F. which comprises:
   a lower package member of polyethylene terephthalate-azelate film, such film being stretch-oriented and heat-set and in substantially flat form in the package;
   a thermoformable upper package member of polyethylene terephthalate film having a degree of crystallinity of less than 5%;
   a food product positioned between the upper and lower package members in a substantially air-free state with the upper package member being in skin-tight engagement with the food product; and
   said upper package member heat sealed directly to the lower package member without the use of adhesives, thereby forming a heatsealed, vacuum skin-package.

* * * * *